June 5, 1928.
H. LEBERMAN
RECEPTACLE
Filed Nov. 17, 1927
1,672,417
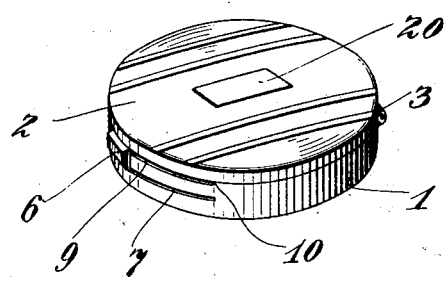
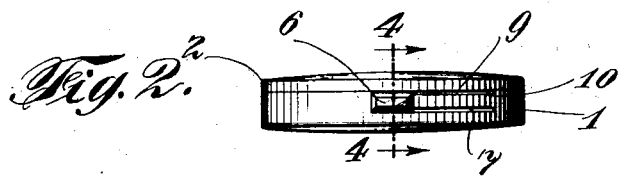
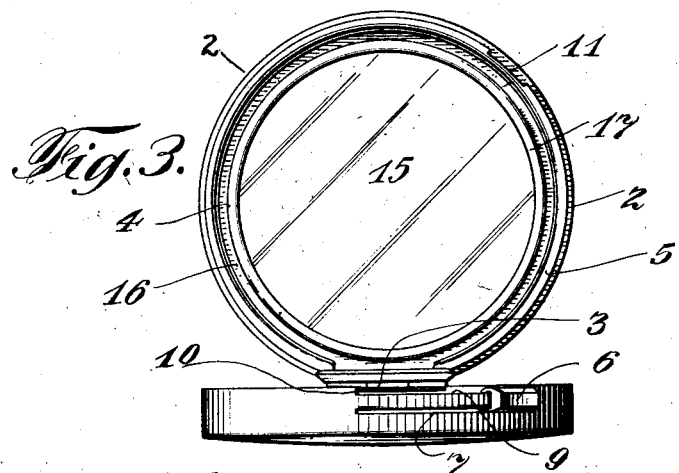
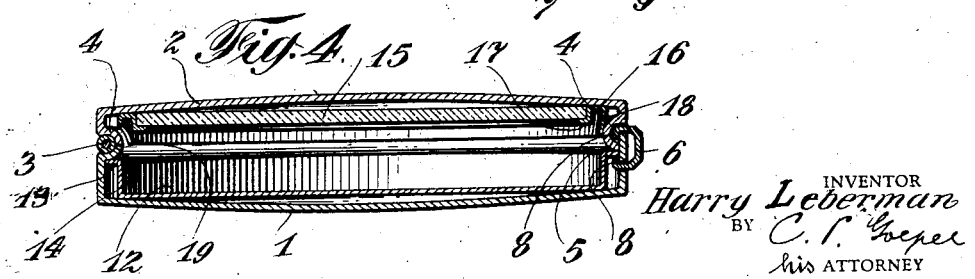
INVENTOR
Harry Leberman
BY C. T. Goeper
his ATTORNEY Patented June 5, 1928.

1,672,417

UNITED STATES PATENT OFFICE.

HARRY LEBERMAN, OF NEW YORK, N. Y., ASSIGNOR TO GROOVE LOCK CO., INC., OF NEW YORK, N. Y., A CORPORATION OF NEW YORK.

RECEPTACLE.

Application filed November 17, 1927. Serial No. 233,778.

My invention relates to improvements in receptacles; especially receptacles comprising a body and a closure or lid attached thereto, so that the receptacle can be shut by putting the lid down and fastening the same in place.

An object of the invention is to provide a receptacle comprising a body and closure therefor and having simple, effective and easily operated means for keeping the receptacle shut, and releasing the lid to permit the receptacle to be opened.

Another object of the invention is to provide a receptacle that can be easily manufactured and yet is strong and durable, having all of its parts securely disposed and with small liability of getting out of order.

The objects and advantages of the invention are fully set forth in the following description, taken with the accompanying drawings, which disclose a preferred embodiment of the idea underlying my invention. But this disclosure is illustrative only and I may vary the details of shape, size and arrangements of parts without exceeding the spirit or scope of the invention as the same is defined in the appended claims.

On the drawings Fig. 1 shows a top view in perspective of a receptacle according to my improvement.

Fig. 2 is a front view thereof with the receptacle closed.

Fig. 3 is a similar view with the receptacle open on a larger scale; and

Fig. 4 is a transverse section, on a larger scale.

The same numerals identify the same parts throughout.

In the particular description of the drawings I use the figure 1 to indicate the body of the receptacle and 2 the closure therefor secured to the body by means of a hinge 3. The receptacle is shown as having a form of a round vanity case, but obviously the principle of the invention may be practiced in connection with cases other than vanity cases and of different shapes. The closure 2 has a portion 4 of reduced diameter and this portion 4 has its edge or rim out-turned to provide an annular rib 5. When the receptacle is closed by putting down the lid the rib 5 and portion 4 telescope within the rim of the body 1 as clearly indicated in Fig. 4. The hinge 3 may be an ordinary spring hinge if desired so that when the closure 2 is released it will fly open; and I employ a sliding catch 6 mounted upon the body 1 to keep the lid 2 closed when the casing is to be shut.

The catch 6 may be made of a piece of bent metal having its edges turned over towards each other so as to give a C-shape when seen in end view or section as indicated in Fig. 4. The body 1 has a slot 7 through which one end of the catch projects and this edge is turned over as indicated at 8 in Fig. 4 so that it cannot be withdrawn from the slot 7. Similarly the opposite edge of the catch 6 is bent over and down behind the bottom edge of a long recess 9 in the rim or top edge of the body 1, the sides of the recess 9 being indicated at 10 forming shoulders. The recess may be as deep as the thickness of the adjacent portion of the catch or fastening member 6 so that the catch will not project above the rim of the body 1. The catch 6 may move back and forth as far as the length of the slot 7 and recess 9 will permit; and the catch 6 acts to hold the casing closed by engaging the annular rib 5. As long as this rib is under the down turned edge 8 of the catch 6 where the upper part of the catch projects over the bottom of the recess 9 the casing will be shut. To release the lid however I provide the rib 5 with a cut away portion 11 of the same size as the length of the catch 6 and disposed so that this cut away part or recess 11 will lie adjacent one end of the slot 7 when the casing is shut. To release the lid 2 the catch is pushed over until the down turned edge thereof which passes through the recess 9 will register with the recess 11. Then of course it no longer holds the lid 2 and the latter can move to open position.

When it is desired to close the receptacle the catch 6 is pushed over to the position shown in Fig. 3 for instance, the lid 2 is moved downward to cause the reduced portion 4 and rib 5 to telescope within the upper part of the body 1, and movement of the lid is then not obstructed by the catch 6 because the catch 6 will then be in line with the recess 11. The catch 6 is now moved from the position shown in Fig. 3 to that shown in Fig. 2, the upper part of the catch which projects over the bottom of the recess 9 then moving away from the recess 11, so that the downturned upper edge of the catch 6 will engage the upper side of the rib 5 and hold the lid 2 closed. The slot 7 and recess 9 may be given any desired dimension.

The body 1 may receive a tray 12 having an outturned rim 13 and the point at which the hinge 3 is situated may be bent to extend inward slightly over the rim 13 as indicated at 14 in Fig. 4. The inside of the lid 2 may carry a mirror 15 secured in place by a retaining ring 16 which has one edge bent to extend to overlap the mirror 15 as indicated at 17. The outer edge of this rim may be bent as indicated at 18 to lie against the inner surface of the reduced portion 4 and this edge may be cut away as indicated at 19 adjacent the hinge 3 to facilitate putting the mirror and retaining ring in place. This ring 16 should fit snugly within the lid 2 and the bent part 18 should preferably be resilient so that it will engage the reduced portion 4 enough to hold the mirror in the lid 2 and yet permit the mirror and the ring to be easily inserted into the lid 2.

The top of the lid may have a panel or space 20 for a monogram or the owner's initials.

The foregoing description sets forth clearly the construction of the receptacle according to my invention and indicates that such a receptacle can very easily be made out of metal or other suitable material, easily operated and used for a long while without getting out of order, breaking or suffering from wear. The contents can be put into the tray 12 and removed or replaced and renewed whenever necessary. The catch 6 effectively keeps the casing shut and easily permits it to be opened.

I claim:

1. A receptacle comprising a body and hinged closure, said closure having a reduced portion which enters the body when the receptacle is shut, said portion carrying a recessed rib and a sliding closure mounted upon the body to engage said rib and keep the closure shut.

2. A receptacle comprising a body having a slot and a recess in its rim adjacent the slot, a fastener member having its edges projecting into the body through said slot and recess, a closure for the body, the closure having a rib which telescopes into the body when the closure is shut to be engaged with said fastener member.

3. A receptacle comprising a body, a closure therefor, the closure having a reduced portion terminating in an annular rib which telescopes within the body when the closure is shut, the rib having a recess therein, said body having a slot and a recess in the rim thereof and a C-shaped closure having its edges projecting into the body, through the slot and last-named recess and bent to be retained in slidable engagement with the body, the upper edge of the fastener member being adapted to engage the rib and hold the closure shut or to release the closure when moved into position adjacent the recess in said rib.

4. A receptacle comprising a body, a hinged closure therefor, a tray having an outturned flange inserted into said body and a sliding catch for securing the closure in shut position, the catch being mounted on the body, and having a portion for engaging said flange.

5. A receptacle comprising a body, a closure therefor, having a contracted rim, a mirror disposed against the inner face of the closure and a retaining ring encircling said mirror, said ring having its inner edge bent over upon the mirror and its outer edge bent for engaging the inner surface of the contracted rim to keep the mirror in position.

6. A receptacle comprising a body, a hinged closure therefor, the closure having a contracted rim which telescopes within the body when the receptacle is shut, a mirror disposed against the inner face of the closure and a retaining ring having its inner edge bent over for engaging the mirror and its outer edge bent over to press against the inner surface of said contracted rim.

7. A receptacle comprising a circular body and a movable closure, one of which parts has a curved surface with a slot therein following the curvature of said surface, said part also having its rim recessed adjacent the slot, and a slidable fastener having portions engaging said slot and said recessed rim to move from end to end along the slot, and means on the other part extending between the slot and recessed rim when the closure closes the body and adapted to be engaged or released by the fastener on the movement of the fastener in the slot, so that the closure can be kept shut or opened.

8. A receptacle comprising a hollow body, having a circular wall, and a movable closure for said body, said closure having a rib extending into the body when the closure is closed, the body having a slot in the circular wall extending along a part of the wall, and a fastening member having portions engaging the slot and the rim of the body, the slot being longer than the fastening member, and the closure having a recess in said rib of greater width than the length of the fastening member, so that when the fastening member is moved along the slot and the rim of the body into registry with said recess, the closure is released and can be opened; and when the fastening member is moved along the slot and rim of the body to engage the rib and being out of registry with said recess, the receptacle can be kept closed.

In testimony that I claim the foregoing as my invention, I have signed my name hereto.

HARRY LEBERMAN.